United States Patent [19]
Premerlani

[11] Patent Number: 5,958,060
[45] Date of Patent: Sep. 28, 1999

[54] METHOD AND APPARATUS FOR CLOCK CONTROL AND SYNCHRONIZATION

[75] Inventor: William James Premerlani, Scotia, N.Y.

[73] Assignee: General Electric Company, Schenectady, N.Y.

[21] Appl. No.: 09/002,432

[22] Filed: Jan. 2, 1998

[51] Int. Cl.[6] ..................................... G06F 1/04
[52] U.S. Cl. .......................... 713/400; 713/501; 713/600
[58] Field of Search .................................. 395/551, 552, 395/553, 558, 555, 556; 377/43, 47, 48, 50

[56] References Cited

U.S. PATENT DOCUMENTS

| 3,806,918 | 4/1974 | Cauthron et al. | 340/347 DD |
|---|---|---|---|
| 4,715,000 | 12/1987 | Premerlani | 364/484 |
| 5,514,978 | 5/1996 | Koegl et al. | 324/772 |
| 5,576,664 | 11/1996 | Herold et al. | 331/1 A |
| 5,598,448 | 1/1997 | Girardeau, Jr. | 375/376 |
| 5,742,649 | 4/1998 | Muntz et al. | 375/371 |
| 5,826,066 | 10/1998 | Jardine et al. | 395/551 |

FOREIGN PATENT DOCUMENTS 9612969  5/1996  WIPO .

OTHER PUBLICATIONS

"Internet Time Synchronization: The Network Time Protocol" by DL Mills, IEEE Trans on Communications, vol. 39, No. 10, Oct. 1991.

"Charge Comparison Protection of Transmission Lines–Relaying Concepts" by Leonard J. Ernst, Et Al, 1992 IEEE, 92 WM. 209–7 PWRD, pp. 1–9.

"Charge Comparison Protection of Transmission Lines–Communications Concepts" by Norman P. Albrecht, et al, 1992 IEEE, 92 WM 210–5 PWRD, pp. 1–7.

"High Speed Phase Segregated Line Differential Relay" by H. Peterson, ABB Inc., Canada, Paper #102, Mar. 1995 Vancouver, B.C. pp. 1–10.

"Type HCD PCM Current Differential Carrier Relay Scheme" by Mitshubishi Electric Corp., 15 Pages.

"Digital Current Differential Relay Type D2L7E" by Toshiba, pp. 1–11.

"Synchronized Phasor Measurements in Power System" by AG Phadke, IEEE Computer Applications in Power, Apr. 1993, pp. 10–15.

"Computer Relaying for Power Systems" By Arun Phadke, et al, 1988, Chap 3.6, Discrete Fourier Transform–pp. 85–88; Chap 4.3 Relaying as Parameter Estimation–pp. 123–129; Chap 5.2 Power Transformer Algorithms–pp. 166–176; Chap 8.9 Adaptive Relaying pp. 260–263.

*Primary Examiner*—Dennis M. Butler
*Attorney, Agent, or Firm*—Ann M. Agosti; Jill M. Breedlove

[57] ABSTRACT

A method for synchronizing clocks includes: sensing currents at multiple terminals; exchanging current and time stamp data between local and remote terminals; estimating a frequency deviation between local clock and power system frequencies; estimating a time based phase deviation with the time stamp data; estimating a current based phase deviation between the currents at the local and remote terminals; and using the frequency, time based phase, and current based phase deviations to synchronize the local clock. An integer counter value of the clock can be controlled by adjusting the integer counter value based on a sum of fractional counter values to increase clock resolution.

10 Claims, 5 Drawing Sheets

METHOD AND APPARATUS FOR CLOCK CONTROL AND SYNCHRONIZATION

BACKGROUND OF THE INVENTION

The present invention relates to the control and synchronization of clocks used for driving counters to generate control pulses.

Conventional methods include driving a digital counter with a crystal-controlled clock. The counter is typically initialized with a value dependent on the base crystal frequency and the desired pulse rate. The counter then counts down by one each time it receives a pulse from the crystal. When the counter reaches zero, it produces an output pulse, resets to the initial count, and starts a new count down cycle. The resolution in the output rate of conventional counters is limited by the pulse frequency of the crystal. For example, a ten (10) megahertz crystal produces a resolution of 0.1 microseconds. For an application requiring a controllable output pulse rate of one (1) pulse every 250 microseconds, the resolution is 1 part in 2500. Some applications, however, such as applications that require close synchronization of data sampling at multiple locations, require a higher resolution.

Many power system monitoring, protection, and control functions could be performed more efficiently and accurately if power system digital measurements at multiple locations were synchronized. Generally such measurements are only somewhat synchronized because of difficulty in accurately synchronizing sampling clocks physically separated by large distances. Conventional uses of digital communications to synchronize sampling clocks at remote locations have accuracies limited by uncertainties in the message delivery time. In particular, digital communications can have different delays in different directions between a pair of locations which lead to an error in clock synchronization.

In addition to being important for multi-terminal transmission lines, time synchronization is important in many other applications such as power relays, determinations of sequences of events, economic power dispatch, and any other situation requiring synchronization of clocks.

SUMMARY OF THE INVENTION

Thus there is a particular need for a method and apparatus for generating controlled pulses on a periodic basis with fine resolution in the output number of pulses over long periods of time. There is also a need for a method and apparatus to provide improved clock synchronization at multiple locations.

A conventional technique for time synchronization, as described in Mills, "Internet Time Synchronization: The Network Time Protocol," *IEEE Transactions on Communications*, vol. 39, no. 10, October 1991, pages 1482–93, is a "ping-pong" technique which uses round trip time tag messages to synchronize clocks which calculate the communications delays. A limitation of the ping-pong technique is that the difference between the delays in each direction between two terminals cannot be determined.

Commonly assigned Adamiak et al., U.S. application Ser. No. 08/713,295, "Digital Current Differential System," filed Sep. 13, 1996, describes a technique for compensating for this uncertainty in the embodiment of two or three terminal transmission lines by using information in the measured currents and digital communication. In this manner, measurement of magnitude and phase angle of power system voltages and currents at multiple locations can be performed on a common time reference. When four or more terminals are used, the conventional ping-pong technique is used.

In one embodiment of the present invention, a method for synchronizing clocks at multiple terminals of a transmission line includes, at each local terminal: sensing a current; exchanging current and time stamp data between the local terminal and at least one remote terminal; estimating a frequency deviation between the frequency of a clock at the local terminal and a power system frequency using the sensed currents; estimating a time based phase deviation by using the time stamp data to compare a time delay between a transmission from the terminal to the at least one remote terminal with a time delay between a transmission from the at least one remote terminal to the terminal; estimating a current based phase deviation by determining a current phase angle deviation between the currents at the local terminal and the at least one remote terminal; and using the frequency deviation, the time based phase deviation, and the current based phase deviation to synchronize the clock at the local terminal.

A method for controlling a clock can include counting down by starting from a predetermined value and subtracting one (1) each time that a crystal produces an input pulse to provide a present count value; and repeating the following series of steps: producing an output pulse after the present count value reaches zero, determining a fraction representative of a difference between a desired output pulse rate and a time between beginning the counting down and producing the output pulse from the clock, adding the fraction to a fraction count value, if the fraction count value equals or exceeds one, decreasing the value of the fraction count value by one, and counting down by starting from a value equal to the predetermined value plus one and subtracting one each time that the crystal produces an input pulse to provide the present count value, and, if the fraction count value is less than one, counting down by starting from a value equal to the predetermined value and subtracting one each time that the crystal produces an input pulse to provide the present count value.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
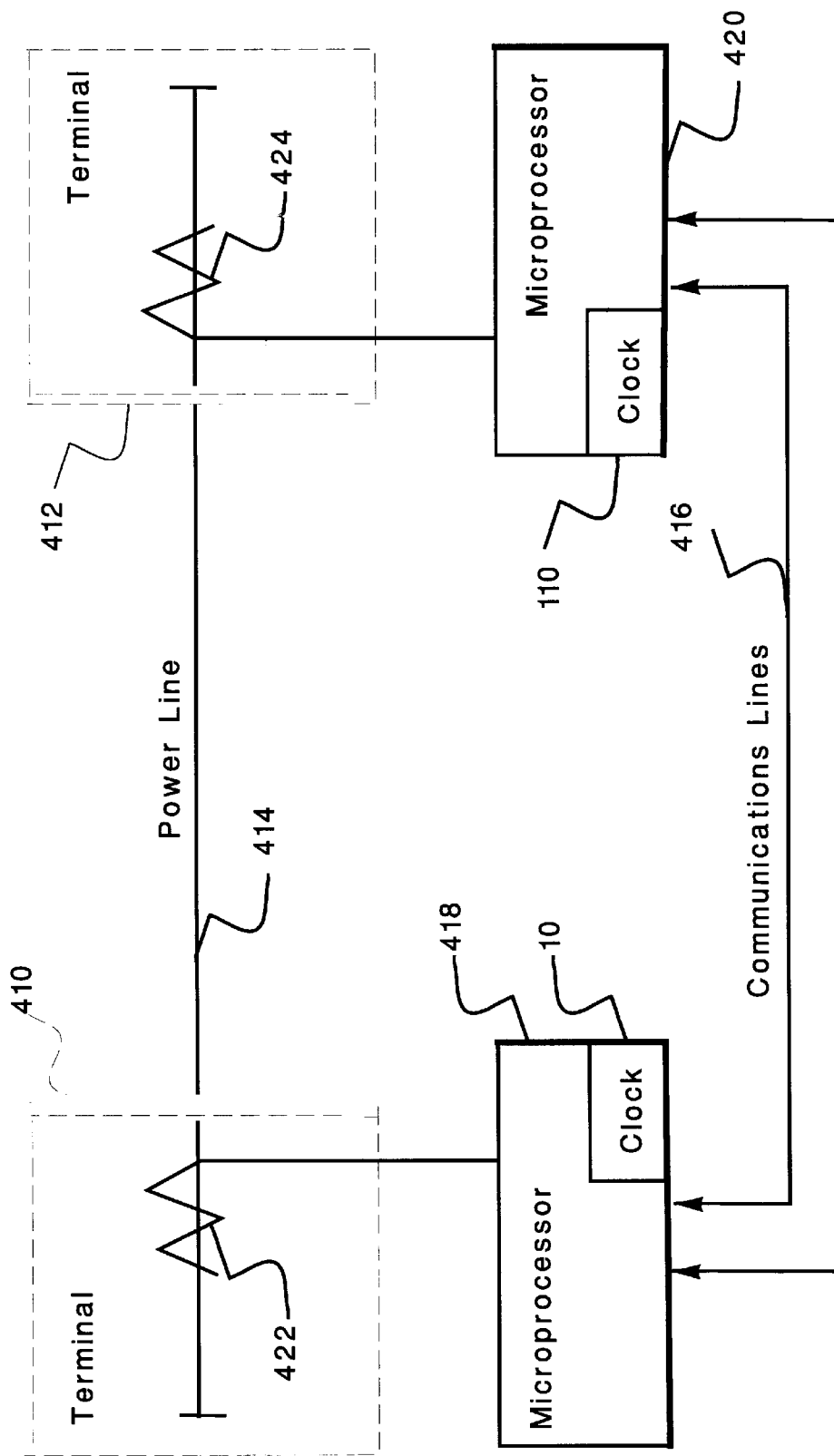
FIG. 1 is a block diagram of a multi-terminal transmission line.

FIG. 1 is a block diagram of a multi-terminal transmission line including two terminals 410 and 412 with a power line 414 and communication lines 416 therebetween. In a two terminal system, two communication lines are useful in the event of a communication line failure. Current sensors 422 and 424 provide current signals to respective computers (shown as microprocessors 418 and 420). In one embodiment, wherein the transmission lines have three phases, each of current sensors 422 and 424 includes three sensors with each sensor sensing a respective phase of the transmission line. The microprocessors can include clocks 10 and 110.

Figure 2:
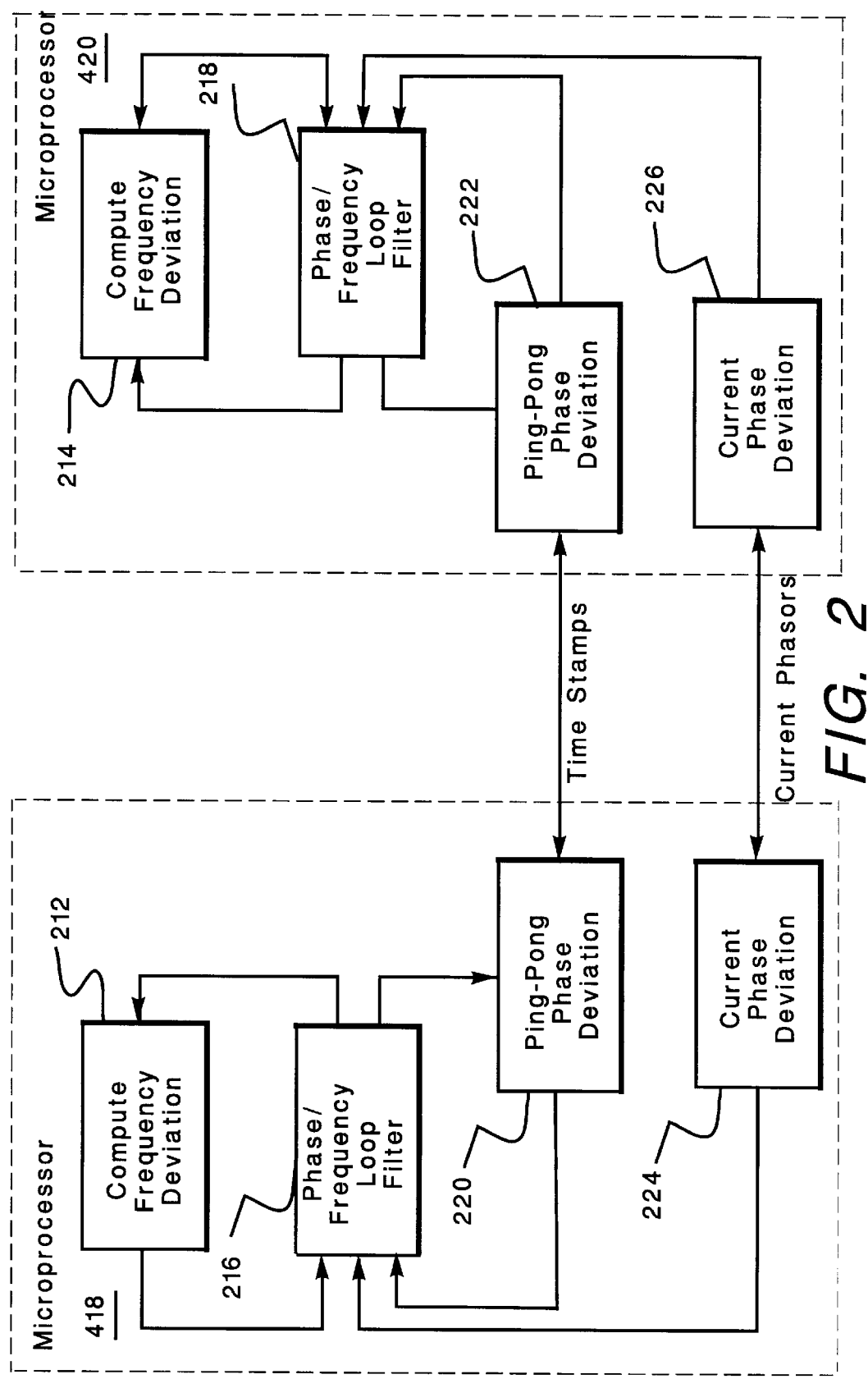
FIG. 2 is a block diagram of a clock synchronization embodiment for a two terminal system.

FIG. 2 is a block diagram of a clock synchronization embodiment for a two terminal system. In one embodiment, distributed synchronization is accomplished by synchronizing the clocks to each other rather than to a master clock with the clocks being phase synchronized to each other and frequency synchronized to the power system frequency. Each microprocessor 418 and 420 compares the phase of its clock to the phase of the other clocks, compares the frequency of its clock to the power system frequency, and then makes appropriate adjustments. As long as there are enough operable communication lines, the clocks will be synchronized. Phase synchronization drives the relative timing error between clocks 10 and 110 to zero and is needed to control the uncertainty in the phase angle of phasor measurements. Frequency synchronization to the power system eliminates a source of error in phasor measurements that arises when data samples do not span exactly one cycle.

As shown in FIG. 2, each microprocessor 418 and 420 uses its respective frequency deviation calculator 212 or 214 to estimate the difference between its power system frequency and its clock frequency based on the rotation of phasors. For the present invention, it is not necessary to know the individual power system and clock frequency values—the difference between them is used. In a similar manner, phase deviation calculators 220, 222, 224, and 226 provide phase deviation data when comparing the two terminals, but actual phase values are not needed to perform the deviation calculations.

Each microprocessor additionally uses its respective time based phase deviation calculator 220 or 222 and its respective current based phase deviation calculator 224 or 226 to estimate the time difference between its clock and the other clocks by exchanging information over communications channels. Phase and frequency loop filters 216 and 218 then use the frequency and phase angle deviation information to make fine adjustments to the clock frequencies.

As discussed in Adamiak et al., for conciseness, a phasor notation is used as follows:

$$\bar{I}(n) = \text{PhasorReal}_n + j \cdot \text{PhasorImaginary}_n, \quad (1)$$

$$\bar{I}_{a,k}(n) = \bar{I}(n) \text{ for phase a from the kth terminal at time step n}, \quad (2)$$

$$\bar{I}_{b,k}(n) = \bar{I}(n) \text{ for phase b from the kth terminal at time step n}, \quad (3)$$

$$\bar{I}_{c,k}(n) = \bar{I}(n) \text{ for phase c from the kth terminal at time step n}. \quad (4)$$

The positive sequence current can then be calculated for each terminal by the following equation:

$$\bar{I}_{pos,k}(n) = \tfrac{1}{3} \{\bar{I}_{a,k}(n) + e^{j2\pi/3}\bar{I}_{b,k}(n) + e^{-j2\pi/3}\bar{I}_{c,k}(n)\}, \quad (5)$$

wherein n is the sample number at the kth terminal of the transmission line.

As discussed in Adamiak et al., the contribution of charging currents can be removed at each respective terminal by subtraction. When a power system transmission line has line resistance and inductance, the sum of the currents entering a terminals is not exactly zero because of the capacitive charging current for the line. For short transmission lines, the charging current can be treated as an unknown error. In these embodiments, no voltage sensors are needed, and line charging current is included as a constant term in the total variance.

For long transmission lines, the charging current can become significant, so charging current compensation using voltage measurements is beneficial. One technique for such compensation is to subtract a C dv/dt term (capacitance multiplied by the change in voltage over time) from the measured current at each terminal of the system. This technique provides compensation of the capacitive current at both the fundamental power system frequency and some of the frequencies of the transient response of the transmission line. The fine details of traveling waves on the transmission line are not compensated for in this embodiment.

When three phase models are used, both phase to phase capacitance (Cpp) and phase to ground capacitance (Cpg) must be analyzed. In terms of zero sequence and positive sequence capacitance, Cpg and Cpp are given by Cpg=Czero (zero sequence capacitance) and Cpp=⅓ Cplus (positive sequence capacitance) minus ⅓ Czero. The compensation technique for each phase can use data from all three phases. For example, the compensation for phase "a" can be provided by Cpg*dVa/dt+Cpp*(2*dVa/dt−dVb/dt−dVc/dt), wherein Va, Vb, and Vc are phase voltages. Another equivalent expression for the phase "a" charging current is Cplus*(dVa/dt−dVo/dt)+Czero*dVo/dt, wherein Vo is the zero sequence voltage.

For some very long lines, the distributed nature of the lines leads to the classical transmission line equations, which can be solved for voltage and current profiles along the line. The compensation model uses the effective positive and zero sequence capacitance seen at the terminals of the line.

In some applications with long transmission lines, shunt reactors can be used to provide some of the charging current required by the line and to interact with the charging capacitance to introduce additional frequency components in the transient response of the transmission line. In one embodiment, the protection charging compensation is set to equal the residual charging current (the difference of capacitive and inductive reactance) at the fundamental power system frequency. The inductor current can be effectively "removed" from the circuit via a current transformer connection (not shown).

Time based phase deviation detection can be accomplished using the conventional ping-pong technique. The amount of time synchronization error in the ping-pong procedure depends on factors including the stability of the local clocks, how often the ping-pong is executed, and differential channel delay. The ping-pong must be executed often enough to compensate for drifts in the local clocks. A small amount of channel delay itself is not critical (and mainly affects only system transient response) provided that the channel delay is the same in each direction between terminals. If the channel delay is not the same, the difference between the delays causes a differential error between the clocks being synchronized over the restraint boundary and reduces the system sensitivity. If four or more terminals are used, the differential delay should be specified and controlled to achieve design goals.

Current based phase angle deviation detection can be accomplished for of two or three terminals by extracting additional information from the current phasors to determine phase angle errors. The basis for detecting deviations in clocks at the termination points of a transmission line is that, according to fundamental circuit theory laws, the sum of the positive sequence currents is equal to the positive sequence charging current for the transmission lines. The positive sequence charging current can be calculated from measured voltages.

Inequalities are attributable to errors in the magnitudes and/or phase angles of the estimates of the positive sequence currents. In a two or a three terminal transmission line embodiment, phase angle errors, which depend on synchronization errors, can be determined approximately for each terminal.

As discussed above, for two or three terminal systems there are two separate sources of clock phase information: the exchange of time stamps over the communications channels and the current measurements themselves. Current measurements generally provide the most accurate information, but are not always available and may contain large errors during faults or switching transients as well as errors due to shunt capacitance current. Time stamped messages are the most reliable source of phase information but may suffer from a phase offset due to a difference in the channel delays in each direction between a pair of terminals. In some situations, one or both directions can be switched to a different physical path, leading to a phase error. For four or more terminals, the only source of phase information is the time tagged message exchange.

Time Based Phase Deviation

For time based phase deviation, during start up, the microprocessors can measure a minimum round trip delay, and during operation the phase error can be estimated as ½ of the absolute value of the difference between the round trip channel delay and the minimum round trip delay.

In one embodiment, the phase difference between a pair of clocks can be calculated by an exchange of time stamps as described in the aforementioned article by Mills. Each microprocessor exchanges time stamps with all other microprocessors that are accessible. It is not necessary to exchange time stamps with every terminal or to have all of the channels in operation. For each terminal that a given terminal can exchange time stamps, the clock deviation is calculated each time a complete set of time stamps arrives. A net deviation is the total deviation divided by the total number of terminals involved in the exchange. For example, in a two terminal embodiment, each respective microprocessor calculates a single time deviations from time stamps and divides the results by two. In a three terminal embodiment, each microprocessor calculates two time deviations and divides the result by three, If a channel is lost in a three terminal system, the single deviation that remains is divided by two.

As described by Mills, four time stamps are need to calculate round trip delay time and phase deviation. Three stamps are included in the message in each direction, and the fourth time stamp is the time when the message is received. Each time a message is received, the newest of the four time stamps are saved to become the first two time stamps of the next outgoing message, and the third time stamp of an outgoing message is the time when the message is transmitted. A fixed time shift is allowed between the stamp values and the actual events, provided the shift for outgoing message time stamps is the same for all terminals and the shift for incoming message time stamps is also identical.

For situations when the first message is transmitted by a given terminal or when an exchange is broken long enough to invalidate the last received set of time stamps (in one embodiment, about 66 milliseconds), the next outgoing set of time stamps may comprise a special start-up set containing transmittal time only. When such a message is received, nothing is calculated from it, except that the message time stamp and the time stamp when the message was received are saved for the next outgoing message.

The time stamp requirements are not very stringent because of the smoothing behavior of the phase locked loop. The time stamp can be a sample count with enough bits to cover the worst round trip including channel delay and processing delay. For example, an eight bit time stamp with one bit corresponding to a $\frac{1}{64}$ of a power system cycle will accommodate a round trip delay of up to four cycles.

The round trip delay can be calculated by subtracting the delay between terminal 1 and terminal 2 (as measured by subtracting a first set of the four time stamps $T_{i-2}$-$T_{i-3}$) from the delay between terminal 2 and terminal 1 (as measured by subtracting a second set of the four time stamps $T_{i-1}$-$T_i$). The clock offset can be calculated by adding the two delays between the terminals and dividing by two. Although the round trip delay is a positive number, the clock offset can be positive or negative if time stamps are unsigned numbers that wrap around. If a roll over of any of the time stamps occurs, the calculations can be compensated. For example, if $T_{i-2}$ is greater than $T_{i-1}$, then a predetermined number can be subtracted from the round trip delay and one half of this value can be subtracted from the clock offset, and if $T_{i-3}$ is greater than $T_i$, then the predetermined number can be added to the round trip delay and one half of this value can be added to the clock offset. If these equations are calculated using integer values of time stamps, a conversion to phase angle in radians can be done by multiplying by $2\pi$. The predetermined number is selected as the number of counts before which the clock rolls over. In one embodiment, for example, wherein there are 64 counts per a cycle and four cycles per a roll over, the predetermined number is 256.

Time stamp values can be obtained using software or hardware, provided that any jitter is limited to less than plus or minus about 130 microseconds. A fixed bias in the time stamp is acceptable if it is the same at each terminal.

Current Based Phase Deviation

As described in Adamiak et al., in a two terminal system, current phase angle deviations ($\phi_1(n)$, $\phi_2(n)$) can be calculated from the positive sequence currents as follows:

$$\phi_1(n) = \frac{1}{2} \cdot \arctan\left(\frac{\text{imag}(\bar{I}_{pos,2}(n) \cdot \bar{I}^*_{pos,1}(n))}{\text{real}(\bar{I}_{pos,2}(n) \cdot \bar{I}^*_{pos,1}(n))}\right), \text{ and} \quad (6)$$

$$\phi_2(n) = -\phi_1(n). \quad (7)$$

It is possible to use a four quadrant arc tangent, in which case the minus signs are needed on the imaginary and real part as shown.

In a three terminal system, the current phase angle deviations ($\phi_1(n)$, $\phi_2(n)$, $\phi_3(n)$) are approximated by the following equations:

$$\phi_1 \approx \frac{\text{real}((\bar{I}_{pos,2}(n) - \bar{I}_{pos,3}(n)) \cdot (\bar{I}^*_{pos,1}(n) + \bar{I}^*_{pos,2}(n) + \bar{I}^*_{pos,3}(n)))}{\text{imag}(\bar{I}_{pos,2}(n) \cdot \bar{I}^*_{pos,1}(n) + \bar{I}_{pos,3}(n) \cdot \bar{I}^*_{pos,2}(n) + \bar{I}_{pos,1}(n) \cdot \bar{I}^*_{pos,3}(n))}, \quad (8)$$

-continued $$\phi_2 \approx \frac{\text{real}((\bar{I}_{pos,3}(n) - \bar{I}_{pos,1}(n)) \cdot (\bar{I}^*_{pos,1}(n) + \bar{I}^*_{pos,2}(n) + \bar{I}^*_{pos,3}(n)))}{\text{imag}(\bar{I}_{pos,2}(n) \cdot \bar{I}^*_{pos,1}(n) + \bar{I}_{pos,3}(n) \cdot \bar{I}^*_{pos,2}(n) + \bar{I}_{pos,1}(n) \cdot \bar{I}^*_{pos,3}(n))},$$ (9)

$$\phi_3 \approx \frac{\text{real}((\bar{I}_{pos,1}(n) - \bar{I}_{pos,2}(n)) \cdot (\bar{I}^*_{pos,1}(n) + \bar{I}^*_{pos,2}(n) + \bar{I}^*_{pos,3}(n)))}{\text{imag}(\bar{I}_{pos,2}(n) \cdot \bar{I}^*_{pos,1}(n) + \bar{I}_{pos,3}(n) \cdot \bar{I}^*_{pos,2}(n) + \bar{I}_{pos,1}(n) \cdot \bar{I}^*_{pos,3}(n))}.$$ (10)

Frequency Deviation

Frequency deviations can be calculated by using the apparent rotation of phasors in the complex plane. The rotational rate of phasors is equal to the difference between the power system frequency and the ratio of the sampling frequency divided by the number of samples per cycle.

As described in Adamiak et al., to determine frequency deviations, for each terminal a quantity can be derived from the positive sequence current (with or without removal of the charging current—depending on the application) that is indicative of the amount of rotation from one cycle to the next by calculating the product of the positive sequence current and the complex conjugate of the positive sequence current from the previous cycle:

$$\text{Deviation} = \bar{I}_{pos,k}(n) \cdot ((\bar{I}_{pos,k}(n-N))^*$$ (11)

The angle of the deviation phasor per cycle for each terminal is proportional to the frequency deviation at that terminal, as discussed in commonly assigned Premerlani, U.S. Pat. No. 4,715,000, issued Dec. 22, 1987.

The frequency deviation is calculated from the deviation phasor Deviation:

$$\frac{\Delta f}{f_o} = \arctan\left(\frac{\frac{\text{imag(Deviation)}}{\text{real(Deviation)}}}{2\pi}\right)$$ (13)

wherein $\Delta f$ is the frequency deviation and $f_o$ is the nominal (system) frequency. A four quadrant arc tangent can be calculated by taking the imaginary and the real part of the deviation separately for the two arguments of the four quadrant arc tangent. Preferably a radian frequency is used in the respective loop filter. The radian frequency can then obtained by the following equation:

$$\Delta\omega = \Delta f \cdot 2\pi.$$ (14)

Or, equations (13) and (14) can be rewritten as follows:

$$\Delta\omega = f_o \cdot \arctan\left(\frac{\text{imag(Deviation)}}{\text{real(Deviation)}}\right).$$ (15)

The frequency deviation information from frequency deviation calculators 212 and 214, the time based phase deviation information from time based phase deviation calculators 220 and 222, and, for two or three terminal systems, the current based phase deviation information from current based phase deviation calculators 224 and 226 is supplied to respective loop filters 216 and 218.

Figure 3:
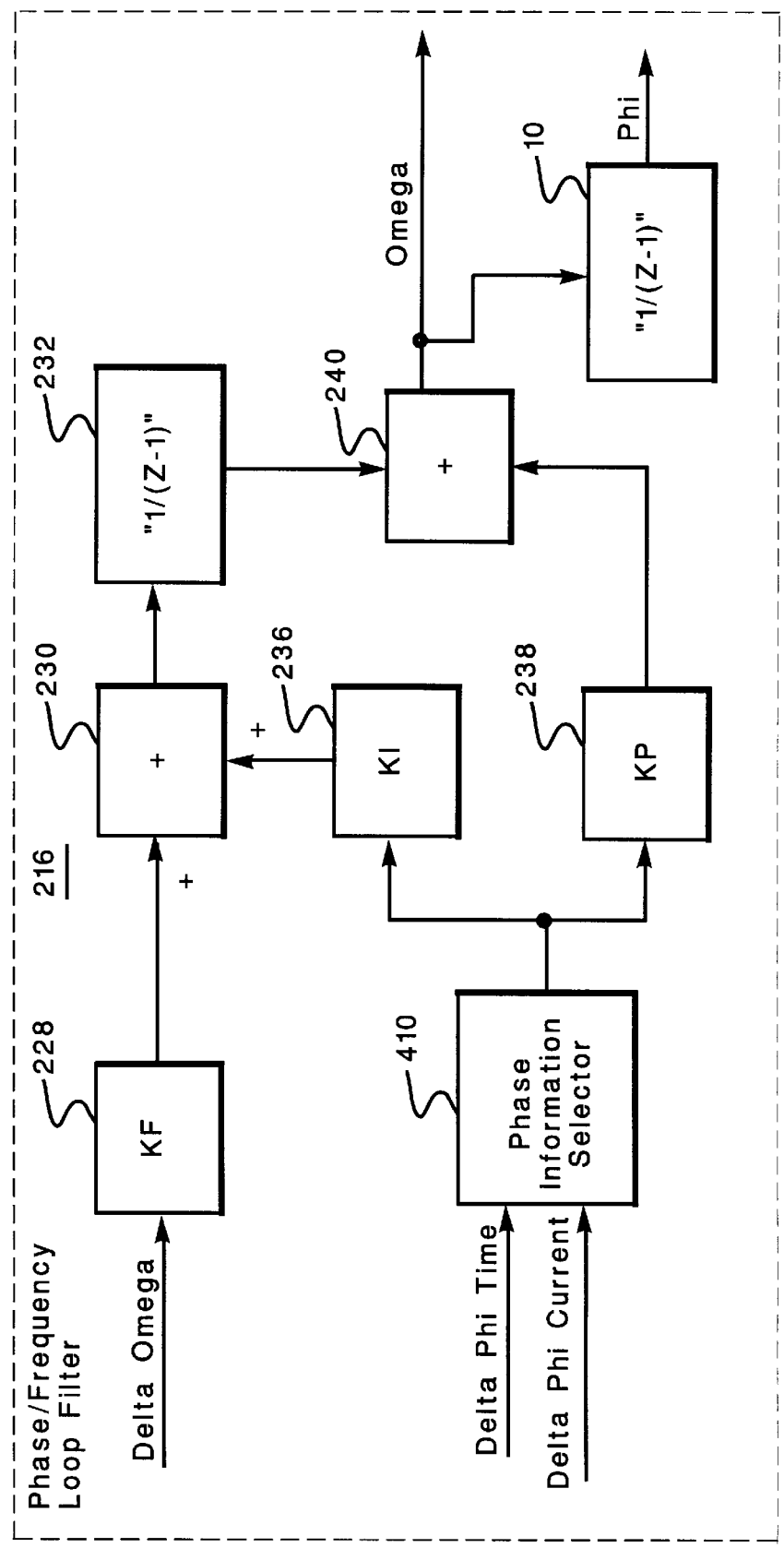
FIG. 3 is a block diagram of a loop filter useful in the embodiment of FIG. 2.

FIG. 3 is a block diagram of a loop filter 216 useful in the embodiment of FIG. 2 wherein a phase information selector 410 determines which of the phase deviation data (time based phase deviation information delta phi time or current based phase deviation information delta phi current) to use. Generally, if available, the current based phase deviation is more precise and is the information which is selected. If the phase deviation is too large, however, the current based phase deviation information may not accurately reflect the large deviation. Therefore, in a preferred embodiment, the phase information selector determines whether the time based phase deviation is greater than a predetermined threshold. Then, even if current based phase deviation information is available, the phase information selector selects the time based phase deviation. In one embodiment, the predetermined time period is one half a cycle.

The primary feedback mechanism shown in FIG. 3 is the use of the selected time or current based deviation information by a proportional plus integral (PI) filter (shown in FIG. 3 as a combination of an integrator 232 and a gain element 236). The PI filter further includes a frequency deviation input signal (delta omega) from an gain element 228 and adder 230 to provide frequency tracking.

Depending on the gains of the PI filter's proportional term and integral term, the transient behavior of the loop can be under damped, critically damped, or over damped. In the present invention, it is preferred that the transient behavior is critically damped. The loop time constant should be selected by considering the goal of critical damping and the effects of both phase and frequency noise. In one embodiment, the time constant for the PI filter main loop is about 10 seconds.

A secondary loop is formed through the frequency deviation input signal of the filter. If a frequency deviation input signal is available, the signal is integrated because frequency is the derivative of phase information. Preferably, the integrator of the frequency deviation input signal is the same integrator 232 of the selected time or current based phase deviation input signal. In one embodiment, the frequency deviation input signal passes through gain element 228 before being added with adder 230 to the signal to be integrated by integrator 232. It is useful to have a single combined integrator because if two separate integrators are used, they can drift in opposite directions into saturation with the loop driving their sum to zero.

In normal operation, frequency tracking at each terminal matches the tracking at all other terminals because all terminals will measure approximately the same frequency deviation. If there is not enough current at a terminal to estimate frequency deviation, frequency tracking at that terminal can be accomplished indirectly via phase locking to other terminals. A small phase deviation must be present for the tracking to occur. To keep the deviation from exceeding a target of about 0.01 radians, the slew rate of frequency tracking should be limited to about 0.0001 hertz per second. With a worst case step change of 0.1 hertz, the time constant of frequency tracking should be at least about 1000 seconds.

Also shown in loop filter 216 is clock 10. The clock behaves in a similar manner as an integrator. In the embodiment of FIG. 3, the clock receives a signal from adder 240 which represents the combination of the output signal of PI filter 232 and the selected time or current based phase deviation signal after passing through gain element 238. The signal from adder 240 is used to adjust the frequency of the clock. The clock can be implemented in hardware and software with a crystal oscillator and a counter as discussed with respect to FIGS. 4 and 5, for example.

If the ratio of the time step of the integrators (1/60 second, for example) to the shortest time constant (10 seconds, for example) is small (⅟₆₀₀, for example), the integrators can be implemented simply as the simple summations with a gain multiplier of the time step (⅟₆₀ second, for example).

There are three gains that must be selected for system design. These gains are determined by the time step of the integrators and the desired time constants of the system as follows:

$$KI = \frac{T_{repeat}}{T_{phase}^2}$$

$$KP = \frac{2}{T_{phase}}$$

$$KF = \frac{T_{repeat}}{T_{frequency}}.$$

$T_{repeat}$=time between executions of the filter algorithm
$T_{phase}$=time constant for primary phase locked loop
$T_{frequency}$=time constant for frequency locked loop In one embodiment, the time step for the integrators is ⅟₆₀ of a second, and the time constants are 10 seconds for the time stamp phase locking and 1000 seconds for the frequency tracking.

Figure 4:
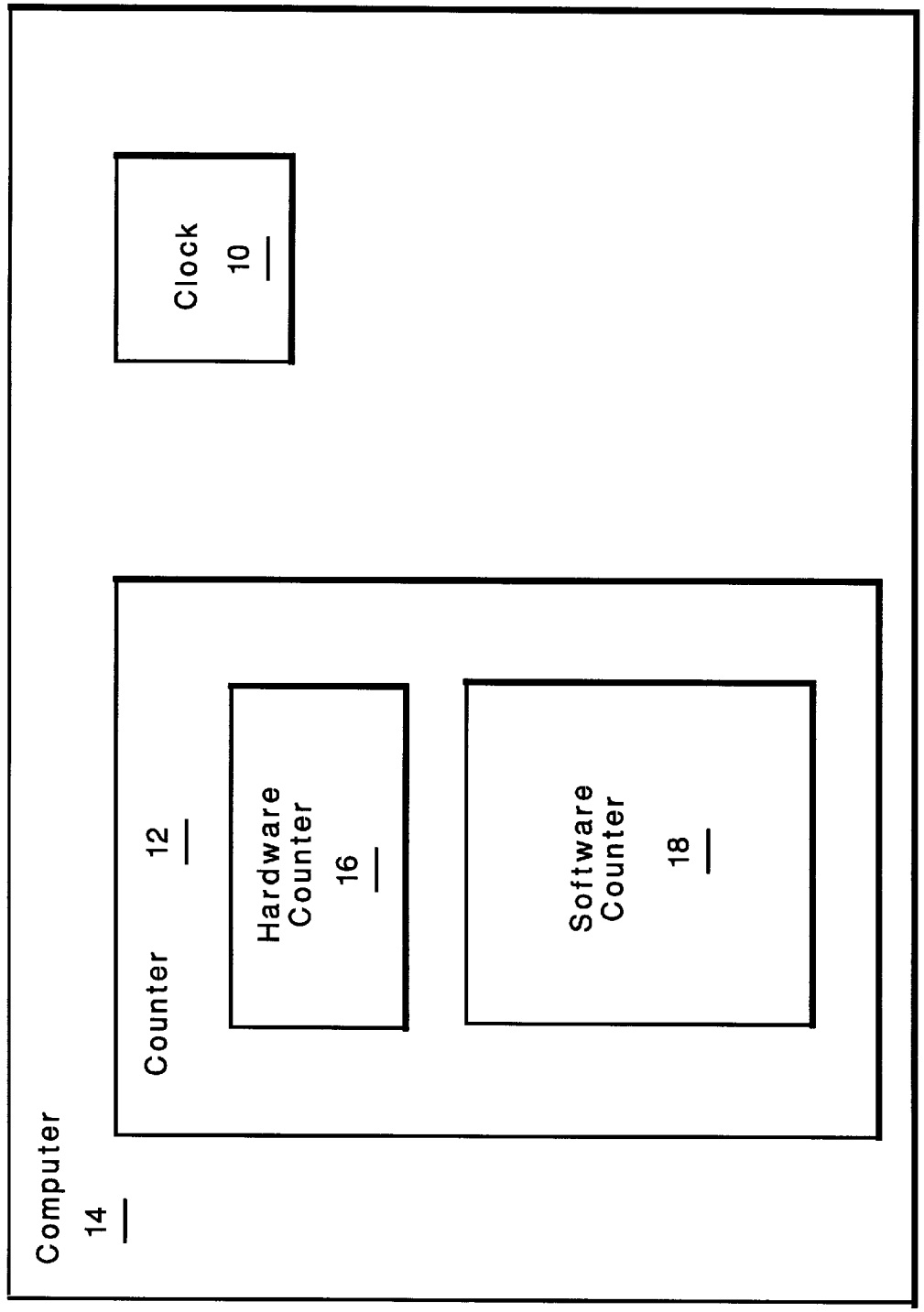
FIG. 4 is a block diagram of a clock and a counter of the present invention.
Figure 5:
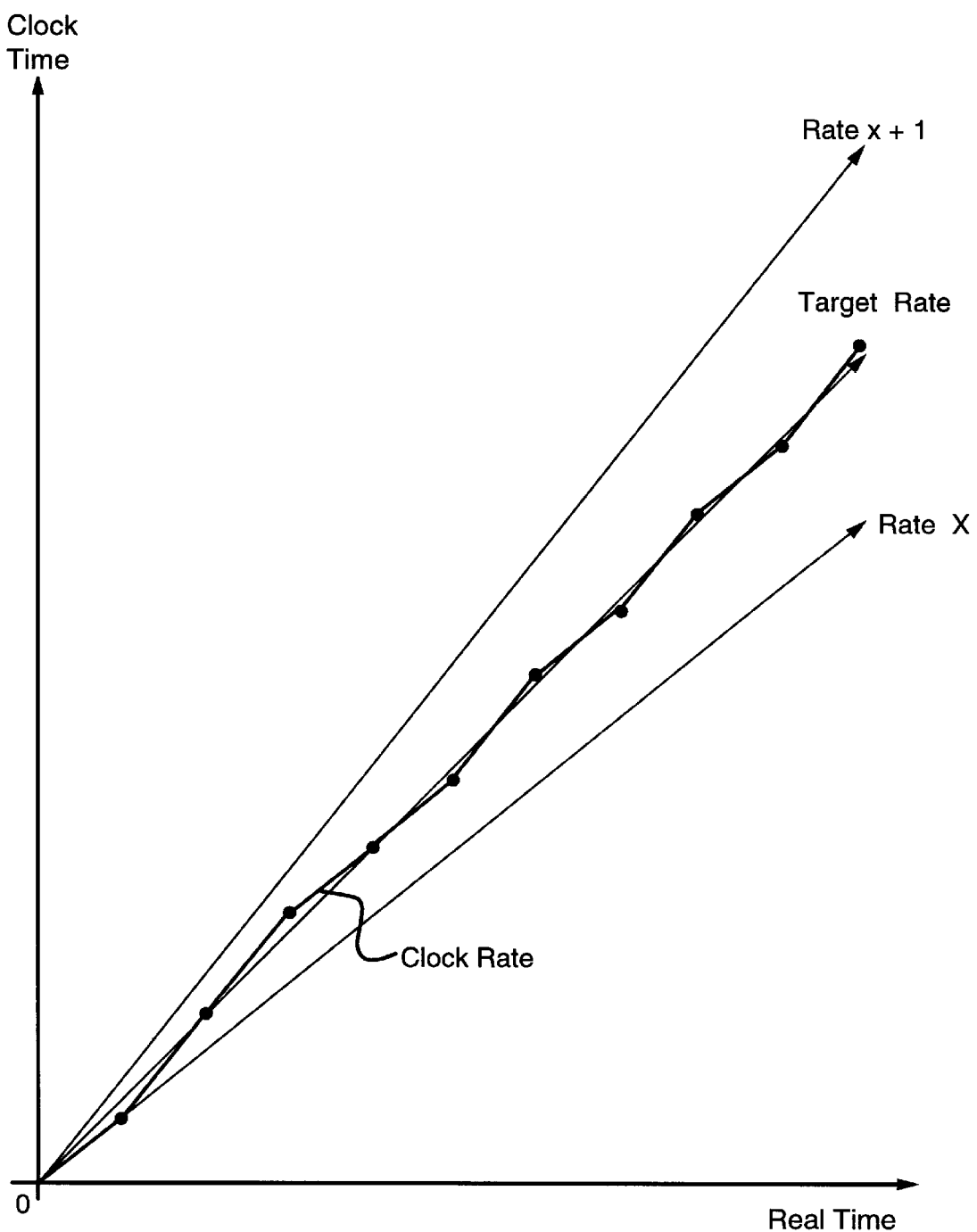
FIG. 5 is a graph of clock time with respect to real time according to one embodiment of the present invention.

FIG. 4 is a block diagram of a clock 10 and a counter 12 of the present invention, and FIG. 5 is an graph of clock time with respect to real time according to one embodiment of the present invention. The counter can be separate from or included in a computer 14. The computer uses a desired output pulse rate to calculate a counter value that includes both an integer portion and a fractional portion. In one embodiment, the counter includes a hardware counter 16 for storing the integer portion and a software counter 18 for storing the fractional portion.

As discussed above, the resolution in the output rate of conventional counters is limited by the pulse frequency of the crystal. Thus a digital clock will generally be operating either too fast or too slow with respect to real time. In the example of FIG. 5, rate$_x$ has a slope which is too low while rate$_{x+1}$ has a slope which is too high. The present invention switches between rate$_x$ and rate$_{x+1}$ in a manner designed to bring the clock closer to the target rate than to rate$_x$ or rate$_{x+1}$.

The resolution of the fractional portion of the clock can be chosen to provide the desired resolution for the time period of the output pulses. The integer portion of the output pulse rate is used as the load value of the hardware counter 16 at the beginning of each output time period.

The fractional portion of the output pulse rate is accumulated into the software counter 18 each time the integer portion is reloaded. The software counter acts as a fractional accumulator with wrap around properties. For example, a value of 0.6 added to 0.8 would produce a 0.4, with an overflow. Each time an overflow is produced, the counter value for the next time period is increased by one count over that indicated by the integer portion of the counter reload value for that period only. The fractional register is not reset, even when the desired period changes.

Thus, the lower rate (rate$_x$) is first used. After an overflow is produced (A), the counter value is increased by 1 and rate$_{x+1}$ is used for the next time period. If an overflow is again produced in the next time period (B), then the counter value is then again increased by 1 and rate$_{x+1}$ is again used for the following time period. If an overflow is then not produced (C), the counter value is not increased, and the lower rate$_x$ is used until an overflow is produced (D). The present invention will switch between rate$_x$ and rate$_{x+1}$ in a manner so that the integral of the rate of accumulated error between the clock rate and the target rate is driven towards zero.

The net effect of the invention is that the time between output pulses takes on two values, one that is slightly lower than the desired value, and one that is slightly higher, in a slowly repeating pattern with an accumulated error that approaches zero over a long time period.

In one embodiment, a 6 megahertz crystal clock and a 16 bit counter are used. The counter is loaded with a desired period, which is four data samples in one embodiment. Each time the period is counted out, data is sampled. After four samples (⅟₁₆ of a cycle), the counter is reloaded. Time periods between data samples are calculated as a 32 bit multiple of the period of the 6 megahertz clock with a 16 bit integer and a 16 bit fraction. Two separate 16 bit registers are used to control the clock. One register controls the integer portion of the time period, and the other controls the fractional portion. The integer register is used to reload the hardware counter every four samples.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

I claim:

1. A method for synchronizing clocks at multiple terminals of a transmission line, the method comprising, at each local terminal:

sensing a current at the local terminal;

exchanging current and time stamp data between the local terminal and at least one remote terminal;

estimating a frequency deviation between the frequency of a clock at the local terminal and a power system frequency using the sensed currents;

estimating a time based phase deviation by using the time stamp data to compare a time delay between a transmission from the local terminal to the at least one remote terminal with a time delay between a transmission from the at least one remote terminal to the local terminal;

estimating a current based phase deviation by determining a current phase angle deviation between the currents at the local terminal and the at least one remote terminal;

using the frequency deviation, the time based phase deviation, and the current based phase deviation to synchronize the clock at the local terminal.

2. The method of claim 1, wherein sensing a current at the local terminal comprises sensing three phase currents at the local terminal and calculating a positive sequence current using the three phase currents.

3. The method of claim 2, wherein using the frequency deviation, the time based phase deviation, and the current based phase deviation to synchronize the clock at the local terminal includes:

selecting a representative phase deviation from the time based phase deviation and the current based phase deviation;

adding a first phase multiple of the representative phase deviation and a frequency multiple of the frequency deviation to provide a summed deviation;

integrating the summed deviation;

adding the integrated summed deviation and a second phase multiple of the representative phase deviation to provide a frequency signal; and sending the frequency signal to the clock.

4. The method of claim 3, wherein selecting the representative phase deviation from the time based phase deviation and the current based phase deviation comprises:

determining whether the time based phase deviation exceeds a predetermined threshold;

determining the availability of current based phase deviation;

if the current based phase deviation is not available or if the time based phase deviation does exceed the predetermined threshold, selecting the time based phase deviation as the representative phase deviation; and if the current based phase deviation is available and if the time based phase deviation does not exceed the predetermined threshold, selecting the current based phase deviation as the representative phase deviation.

5. An apparatus for synchronizing clocks at multiple terminals of a transmission line, the apparatus comprising, at each local terminal:

a current sensor for sensing a current at the local terminal;

a communication path for exchanging current and time stamp data between the local terminal and at least one remote terminal; and a computer for:
estimating a frequency deviation between the frequency of a clock at the local terminal and a power system frequency using the sensed currents, estimating a time based phase deviation by using the time stamp data to compare a time delay between a transmission from the local terminal to the at least one remote terminal with a time delay between a transmission from the at least one remote terminal to the local terminal, estimating a current based phase deviation by determining a current phase angle deviation between the currents at the local terminal and the at least one remote terminal, and using the frequency deviation, the time based phase deviation, and the current based phase deviation to synchronize the clock at the local terminal.

6. The apparatus of claim 5, wherein the current sensor comprises three phase current sensors at the local terminal and the computer is adapted to calculate a positive sequence current using three phase currents sensed by the three phase current sensors.

7. The apparatus of claim 6, wherein the computer is adapted to use the frequency deviation, the time based phase deviation, and the current based phase deviation to synchronize the clock at the local terminal by:

selecting a representative phase deviation from the time based phase deviation and the current based phase deviation;

adding a first phase multiple of the representative phase deviation and a frequency multiple of the frequency deviation to provide a summed deviation;

integrating the summed deviation;

adding the integrated summed deviation and a second phase multiple of the representative phase deviation to provide a frequency signal; and sending the frequency signal to the clock.

8. The apparatus of claim 7, wherein the computer is adapted to select the representative phase deviation from the time based phase deviation and the current based phase deviation by:

determining whether the time based phase deviation exceeds a predetermined threshold;

determining the availability of current based phase deviation;

if the current based phase deviation is not available or if the time based phase deviation does exceed the predetermined threshold, selecting the time based phase deviation as the representative phase deviation; and if the current based phase deviation is available and if the time based phase deviation does not exceed the predetermined threshold, selecting the current based phase deviation as the representative phase deviation.

9. A method for using a crystal clock to achieve a desired output pulse rate, the method comprising:

determining two count rates which are respectively higher than and lower than the desired output pulse rate;

producing an output pulse after counting through a first one of the two count rates; and repeating the following series of steps:

determining a fraction representative of a difference between the desired output pulse rate and a time period elapsed while counting, adding the fraction to a fraction count value, if a magnitude of the fraction count value is greater than or equal to one, removing an integer portion of the fraction count value and producing the output pulse after counting through a second one of the two count rates, and if a magnitude of the fraction count value is less than one, producing the output pulse after counting through the first one of the two count rates.

10. An apparatus for controlling a crystal clock, the apparatus comprising:

a computer for using two count rates which are respectively higher than and lower than the desired output pulse rate, and producing an output pulse after counting through a first one of the two count rates, the computer adapted to repeat the following series of steps:

determining a fraction representative of a difference between the desired output pulse rate and a time period elapsed while counting, adding the fraction to a fraction count value, if a magnitude of the fraction count value is greater than or equal to one, removing an integer portion of the fraction count value and producing the output pulse after counting through a second one of the two count rates, and if a magnitude of the fraction count value is less than one, producing the output pulse after counting through the first one of the two count rates.

* * * * *